(No Model.)
T. A. EDISON.
MACHINE FOR MAKING PHONOGRAM BLANKS.
No. 393,463. Patented Nov. 27, 1888.
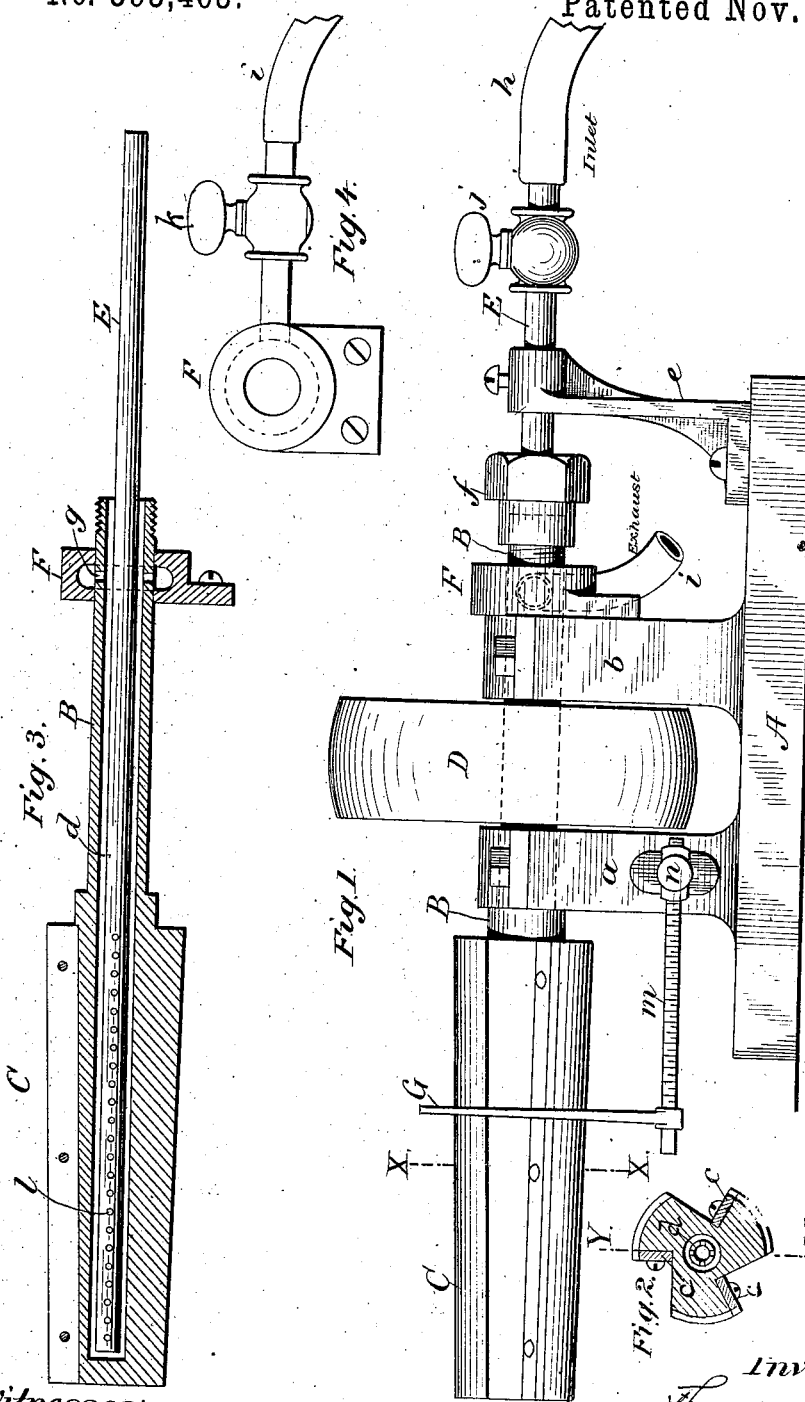

UNITED STATES PATENT OFFICE.

THOMAS A. EDISON, OF LLEWELLYN PARK, NEW JERSEY, ASSIGNOR TO THE EDISON PHONOGRAPH COMPANY, OF NEW JERSEY.

MACHINE FOR MAKING PHONOGRAM-BLANKS.

SPECIFICATION forming part of Letters Patent No. 393,463, dated November 27, 1888.

Application filed May 7, 1888. Serial No. 273,039. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Machines for Making Phonogram-Blanks, (Case No. 769,) of which the following is a specification.

As has been made known by my prior applications for patents, the phonogram-blank which I prefer to employ is one made entirely of wax or a wax composition in the form of a cylinder having a cylindrical outer surface and a tapering bore. These blanks I first mold from the wax or wax composition; but owing to the excessive contraction of the wax in cooling the blanks are somewhat distorted and do not have the accurate shape and size required. Hence it becomes necessary to mold the blanks slightly larger than the size for the finished blanks and then to reduce them by cutting to the proper size and shape, both externally and internally. I have found that the use of the ordinary cutting-tools at ordinary temperatures for this purpose is objectionable. In my application of even date herewith, (Case No. 768, Serial No. 273,038,) I have described a method of finishing these blanks consisting in cutting them externally and internally with heated knives or cutters.

The object of my present invention is to provide a proper tool for reaming out the wax phonogram-blank, so as to make its bore accurately of the size and shape desired.

In the accompanying drawings, forming a part hereof, Figure 1 is a side elevation of the improved reamer. Fig. 2 is a cross-section on the line *x x*. Fig. 3 is a longitudinal section through the reamer and its shaft on the line *y y;* and Fig. 4 is an elevation of the exhaust-outlet for the heating medium.

A is a suitable base or table, from which rise pedestals *a b*, in which is journaled the shaft B, carrying the tapering reamer C. Upon the shaft between the pedestals is the pulley D, by means of which power is applied to the reamer for revolving it rapidly. The reamer C is made tapering, it having the exact size and shape it is desired to give the bore of the wax phonogram-blank. It is provided with cutting-knives *c*. The shaft B and reamer C are made hollow, the passage or channel *d* extending entirely through the reamer, but being closed at the small end of the reamer. Into the channel *d* is introduced centrally a stationary pipe, E, which is rigidly held by a bracket, *e*, rising from the base A, out of contact with the sides of the channel *d*, so that the reamer C and shaft B can be revolved while the pipe E is held at rest. The shaft B terminates between the pedestal *b* and bracket *e*, and is provided with a stuffing-box, *f*, which closes the opening *d* around the pipe E at this point. Secured to the outer face of the pedestal *b* is a box or chamber, F, which fits closely around the shaft B, such shaft being provided with a number of perforations, *g*, where it is covered by this box. The pipe E and the box F are connected with leading-pipes *h i*, provided with stop-cocks *j k*. A heating medium, which is preferably steam, but may be hot water or hot air, is supplied to the pipe *h* and passes into the pipe E at its other end within the reamer C, and then passes out of such pipe E through its open end and through the perforations *l* in such pipe E into the channel *d* around the pipe E, and thence returns through such channel *d* to the perforations *g*, and out of such perforations into the box F, and thence out by the pipe *i*, the flow of the heating medium being controlled by the stop-cocks *j k*. Thus the reamer can be maintained at the precise temperature desired.

To determine the extent to which the wax phonogram-blank will be pushed upon the reamer, I provide a gage-arm, G, which passes over the reamer and is screwed to an arm, *m*, held by a set-screw, *n*, to the side of the pedestal *a*. By means of the set-screw *n* the gage-arm G can be set to any point desired. The arm *m* may have a scale marked upon it to indicate the position to which the gage-arm is set. This enables me to ream out phonogram-blanks of different lengths.

The hollow cylindrical wax phonogram-blanks are taken in the hand and are pushed onto the reamer and withdrawn from it by a continuous motion, the reamer being brought up to the desired temperature and the combined action of heating and cutting rapidly and smoothly reaming out the bore of the blank.

The wax blanks are preferably heated by a hot table, oven, or chamber approximately to the temperature of the reamer before being cut by the reamer, in order to prevent cracking by unequal expansion.

What I claim as my invention is—

1. A revolving reamer having cutting knives or edges, and provided with means for heating it, substantially as set forth.

2. A revolving reamer having cutting knives or edges, and made hollow, in combination with pipe-connections for introducing a heating medium into the hollow reamer, substantially as set forth.

3. The combination, with a revolving shaft, B, and reamer C, made hollow, of a stationary pipe, E, and the box F, substantially as set forth.

This specification signed and witnessed this 28th day of April, 1888.

THOS. A. EDISON.

Witnesses:
WILLIAM PELZER,
A. W. KIDDLE.